US012481486B2

(12) United States Patent
Ghosh et al.

(10) Patent No.: US 12,481,486 B2
(45) Date of Patent: Nov. 25, 2025

(54) LONG METHOD AUTOFIX ENGINE

(71) Applicant: DevFactory Innovations FZ-LLC, Dubai Media (AE)

(72) Inventors: Aditya Kumar Ghosh, Bangalore (IN); Akash Chaudhary, Hapur (IN); Vaibhav Tulsyan, Mumbai (IN); Arun Krishna, New Delhi (IN)

(73) Assignee: DevFactory Innovations FZ-LLC, Dubai Media (AE)

( * ) Notice: Subject to any disclaimer, the term of this patent is extended or adjusted under 35 U.S.C. 154(b) by 255 days.

(21) Appl. No.: 16/911,134

(22) Filed: Jun. 24, 2020

(65) Prior Publication Data
US 2021/0405980 A1 Dec. 30, 2021

(51) Int. Cl.
*G06F 8/41* (2018.01)
*G06F 8/72* (2018.01)

(52) U.S. Cl.
CPC ............ *G06F 8/4441* (2013.01); *G06F 8/436* (2013.01); *G06F 8/72* (2013.01)

(58) Field of Classification Search
USPC ....................................................... 717/151
See application file for complete search history.

(56) References Cited

U.S. PATENT DOCUMENTS

| 10,445,361 | B2* | 10/2019 | Kreutzer | G06F 16/532 |
| 10,705,837 | B2* | 7/2020 | Kadam | G06F 8/443 |
| 11,599,356 | B1 | 3/2023 | Kimball et al. | |
| 2013/0111438 | A1* | 5/2013 | Yoshimura | G06F 8/75 717/120 |
| 2015/0039863 | A1* | 2/2015 | Chiao | G06F 8/4436 712/220 |
| 2015/0100942 | A1* | 4/2015 | Misbhauddin | G06F 8/20 717/104 |
| 2016/0306618 | A1* | 10/2016 | Bansod | G06F 8/65 |
| 2018/0060344 | A1* | 3/2018 | Layzell | G06F 16/178 |
| 2019/0079759 | A1* | 3/2019 | Kadam | G06F 8/77 |
| 2020/0089491 | A1* | 3/2020 | Sahu | G06F 8/75 |
| 2020/0192660 | A1* | 6/2020 | Ananthanarayanan | G06N 20/00 |

(Continued)

OTHER PUBLICATIONS

S. Charalampidou, A. Ampatzoglou, A. Chatzigeorgiou, A. Gkortzis and p. Avgeriou, "Identifying Extract Method Refactoring Opportunities Based on Functional Relevance", 1 Cct 2017, in IEEE Transactions on Software Engineering, vol. 43, No. 10, pp. 954-974 (Year: 2017).*

(Continued)

*Primary Examiner* — Jason D Mitchell
(74) *Attorney, Agent, or Firm* — Kent B. Chambers; Terrile, Cannatti & Chambers, LLP

(57) ABSTRACT

A method and apparatus are disclosed for eliminating overlong source code segments (e.g., methods) by evaluating input source code segments for a plurality of predetermined code metric values to identify a first long code segment based on predetermined code metric values for output and storage in a codefix issue queue, applying multiple extraction algorithms to the first long code segment to generate a second code segment that is semantically equivalent to and shorter than the first long code segment; and then generating a fixed codegraph representation of the software program using the second code segment to replace the first long code segment.

23 Claims, 6 Drawing Sheets

(56) References Cited

U.S. PATENT DOCUMENTS

| | | | | |
|---|---|---|---|---|
| 2020/0293313 A1* | 9/2020 | Kadam | .................... | G06F 8/72 |
| 2020/0387356 A1* | 12/2020 | Davis | ....................... | G06F 8/30 |
| 2021/0194905 A1* | 6/2021 | Fong | .................. | H04L 63/1425 |
| 2021/0405980 A1* | 12/2021 | Ghosh | ...................... | G06F 8/51 |
| 2022/0292092 A1* | 9/2022 | Brown | ............... | G06F 16/2471 |
| 2024/0061680 A1* | 2/2024 | Kadam | .................... | G06F 8/72 |

OTHER PUBLICATIONS

S. Charalampidou, A. Ampatzoglou, and P. Avgeriou, "Size and cohesion metrics as indicators of the long method bad smell: An empirical study", Oct. 2015, PROMISE '15: Proceedings of the 11th International Conference on Predictive Models and Data Analytics in Software Engineering (Year: 2015).*

* cited by examiner

LONG METHOD AUTOFIX ENGINE

BACKGROUND OF THE INVENTION

Field of the Invention

The present invention is directed in general to field of information processing. In one aspect, the present invention relates generally to a software program development tool, method, and apparatus in a data processing system.

Description of the Related Art

Computer programmers, developers, coders and/or software engineers write, test, debug, and maintain computer software or code instructions, called computer programs, which computers must follow to perform their functions. When writing or making changes to computer program to address new or unique technical challenges, programmers often create new, original and unique programming source code which can, unfortunately, suffer from performance limitations and other sub-optimalities. For example, a programmer's unique source code may include a number of undetected software bugs or vulnerabilities or otherwise suffer from low quality or robustness. These problems can be exacerbated as he code is updated or new features are added, with the resulting increases in code length and complexity creating additional opportunities for potential problems, like possible bugs, unused code, complicated code, redundant code, code smells, bad practices, and so on. These problems can be addressed with development tools which analyze the code to improve and reduce defects by inspecting the source code (e.g., C, C++ and Objective-C) to identify potential problems and apply code refactoring techniques to address the identified problems by improving nonfunctional attributes of the software (e.g., code readability and simplicity) through restructuring of the code's internal structure without changing its external behavior. For example, in class-based programming or object-oriented programming environments, a programming "method" often starts out as being well-written, but as additional code lines and complexity are added to include more and more functionality, the method becomes harder to maintain, understand, debug or reuse. Thus, long methods, alongside long classes, are a bad smell in software systems which does not influence the correctness of code, but makes it harder to understand and therefore harder to maintain.

A common way to fix long methods is to break them down into smaller chunks. To do this, developers need to invest a considerable amount of time in finding the extractable group of statements that are best suited for an extract method refactoring, and then extract it. This extraction process can be difficult when the extractable group of statements are interleaved with other code lines. The developer will repeat the extracting process until smaller functions are created. While modern integrated development environments (IDE) include built-in refactoring tools for detecting long methods in source code (e.g., PMD, JDeodorant, FindBugs, Understand, and Source Making), such tools typically define a single line count threshold value that is compared against the total number of lines in the method or the total code lines (i.e., no non-blank lines) when assessing whether a method exceeds the code length threshold. As a result, the large number of methods being flagged as overlong make the identified results non-actionable and/or include numerous false positives in this approach. Another drawback with most IDEs is that they cannot automatically refactor long methods. While JDeodorant includes an Eclipse plugin that can automatically identify long methods in software and resolve them by applying appropriate refactorings to extract the long methods, this tool has not been widely adopted or updated for years. Thus, while the use of source code analyzer tools is considered a best practice for software development, the existing solutions are extremely difficult at a practical level by virtue of the difficulty in accurately and efficiently identifying overlong methods.

SUMMARY OF THE INVENTION

A system, apparatus, and methodology are described for efficiently identifying and fixing long methods code smells in a code repository (a.k.a., repo) to improve source code performance, reuse and/or maintainability by automating the actionable identification and prioritization of overlong code segments for refactoring treatment, and then applying a combination of code extraction services to split long methods into smaller methods until all new methods are sufficiently small or no more splitting can be done. Selected embodiments of the present disclosure provide a long method autofix engine having web services that automate the process of fixing long method issues across a whole repo to lower product maintenance cost and improving code quality. A first finder web service is configured to automatically identify long methods in a CodeGraph sandbox representation of the code repo being analyzed and outputting CodeFix issues. In selected embodiments, the finder service may be invoked or scheduled to process a CodeGraph sandbox input by identifying (a simple count of method LOC) long methods in the code repo, grouping them into batches, optimizing the batches for performance and correctness, and then storing them as CodeFix issues. In selected embodiments, the finder service applies one or more filters and tailored code length thresholds to each code segment in the submitted source code to eliminate certain code segments as long segment candidates, to reduce their effective code length, and/or to evaluate the computed effective code length against the tailored code length thresholds which may be individually configurable by the programmer. A second fixer web service is configured to automatically fix previously identified CodeFix long method issues. In selected embodiments, the fixer service may be invoked or scheduled to fix long method issues by takes as input a previously identified CodeFix issue and processing the contained long methods occurrences in parallel. In selected embodiments, the fixer service alternately applies two fixing algorithms on long methods, including a block and variable based extraction algorithm and a variable-cohesion based extraction algorithm. Selected embodiments of the disclosed system, apparatus, and methodology use machine learning, natural language processing (NLP), and/ or artificial intelligence (AI) in combination with static and/or dynamic code analysis techniques to automatically identify and refactor code segments having excessive length.

The objects, advantages and other novel features of the present invention will be apparent from the following detailed description when read in conjunction with the appended claims and attached drawings.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

A long method/code segment autofix engine, methodology, and apparatus are described for efficiently and accurately identifying and fixing overlong code segments in a method, class, code, or entity by identifying long methods in a CodeGraph sandbox representation of the code repository, and then refactoring the long methods into smaller methods by using a combination of extraction algorithms. In disclosing the claimed method and system for identifying and fixing overlong code segments by using specific rules, rather than humans, to identify, group, and optimize long code segments for storage as codefix issues which are processed in parallel using an alternating combination of predetermined extraction algorithms, there is disclosed an improvement in computer-related technology that uses a combined order of specific rules that renders information into a specific format that is then used and applied to create desired results in the form of splitting identified overlong code segments into smaller code segments that are semantically equivalent to the long code segment.

While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
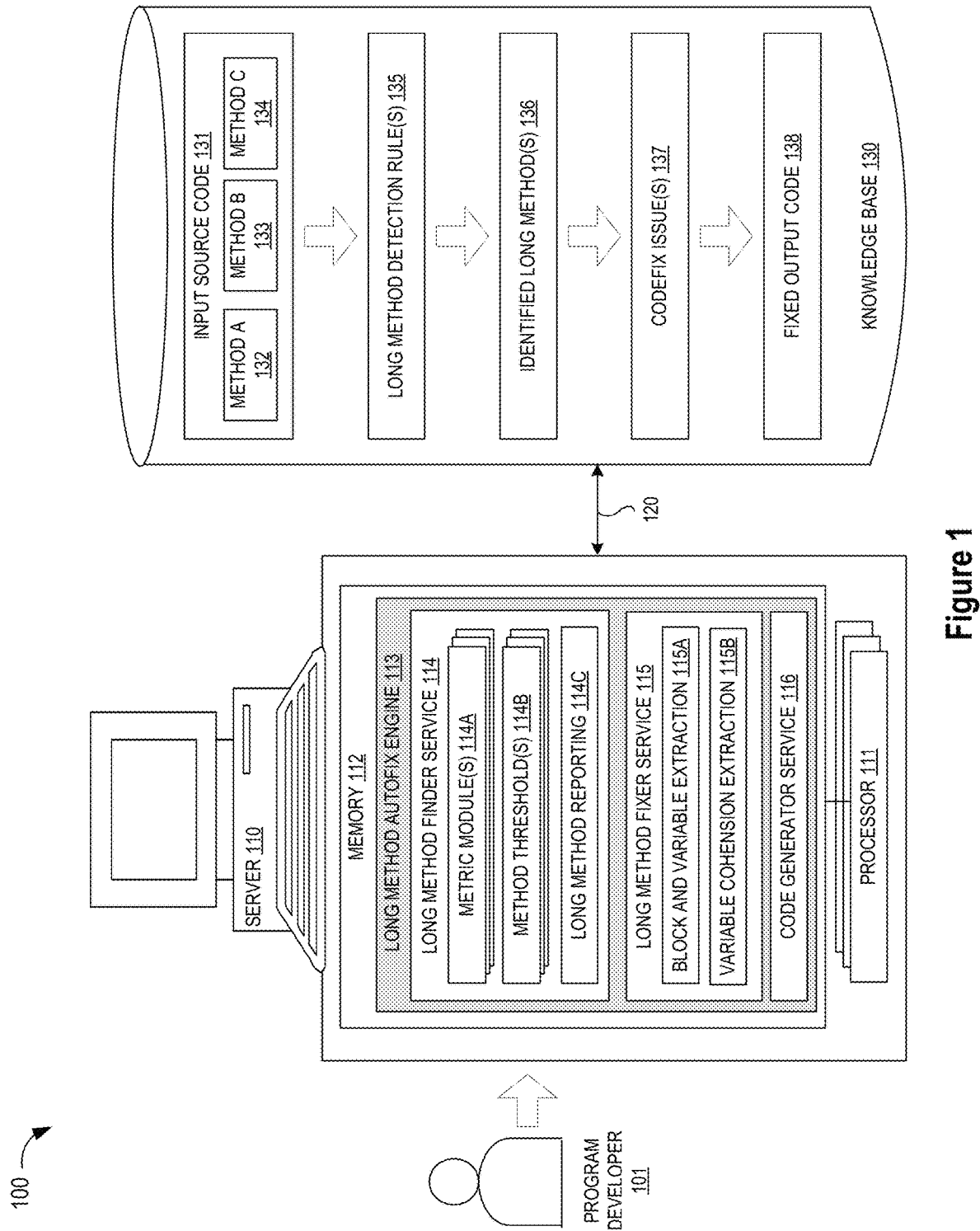
FIG. 1 is a simplified block diagram of a data processing system for detecting and fixing long methods long methods in accordance with selected embodiments of the present disclosure.

Referring now to FIG. 1, a simplified block diagram illustrates an exemplary data processing system 100 for automatically identifying and fixing overlong code segments (e.g., long methods) with one or more server/computer systems 110 and associated database storage devices 130 which may be connected together over a suitable connection link 120 or network, such as a private wide area network (WAN) or the Internet (not shown), to evaluate input source code 131 that is input by a program developer 101. In some illustrative embodiments, the server/computer system 110 may be embodied as a cognitive computing system to use NLP, machine learning, and/or artificial intelligence processing techniques which are augmented with the mechanisms of the illustrative embodiments described hereafter. In a cognitive computing system implementation, a long method autofix engine 113 may be embodied as a computer program stored in memory 112 which uses one or more processors 111 to query a structured or unstructured knowledge or information in the knowledge database 130 which includes input source code files 131, one or more long method detection rules 135, identified long methods 136, codefix issues 137, and fixed output code 138.

To process the knowledge or information in the knowledge database 130, the long method autofix engine 113 may include a long method finder service 114 that is configured to assess input source code files (e.g., Methods A-C 132-134) against the long method detection rules 135 for purposes of prioritizing and reporting an identified long method 136 (e.g., Method B 133) to a codefix issue queue 137 as a candidate for refactoring treatment. In addition, the long method autofix engine 113 may include a long method fixer service 115 that is configured to automatically process long methods listed in the codefix issue queue 137 in parallel to split the long methods into shorter methods. Finally, the long method autofix engine 113 may include a code generator service 116, such as a refactoring library service, that is configured to generate a fixed output code 138 by replacing the long method code segments with semantically equivalent short methods. The configuring one or more of the long method autofix services 114-116 may include providing application specific hardware, firmware, and/or software to implement one or more control logic modules 114A-C, 115A-B, 116 to facilitate the performance of the operations and generation of the outputs described herein with regard to the illustrative embodiments. In addition or in the alternative, the configuring of the services 114-116 in the long method autofix engine 113 may include storing software applications in one or more storage devices and loaded into memory of a computing device, such as server 110, for causing one or more hardware processors (e.g., 111) of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

As will be appreciated, once the server/computer system 110 is configured to implement the long method autofix engine 113, the server/computer system 110 becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates identification, prioritization, and refactoring of long code segments into shorter code segments by using the finder service 114 to identify, batch, and optimize long methods for processing by the fixer service 115 which alternately applies predetermined fixing algorithms, such as a block and variable based extraction algorithm 115A and a variable-cohesion based extraction algorithm 115B, to split the identified long methods into smaller methods until all new methods are sufficiently small or no more splitting can be done.

As a preliminary step in identifying and fixing overlong code segments from an input source code file 131, the long method autofix engine 113 may include a long method finder service 114 that is responsible for identifying long methods in the input source code 131. In selected embodiments, the input source code 131 is a CodeGraph database file having a data structure which maps all entities and relationships for the input source code 131. To enable the analysis of the input source code file 131, the long method finder service 114 may retrieve a snapshot of the input source code file 131 from a CodeGraph sandbox container which runs a Neo4J graph engine mounting a copy of the CodeGraph database file. A graph database structure for the input source code 131 has the advantage of allowing quicker and more efficient querying of relationships between entities compared to a Relational Database Management System (RDBMS) database structure.

While any suitable algorithm may be used to identify long methods, the finder service 114 may include one or more metric modules 114A which apply NLP or machine learning techniques to assess each code segment (e.g., Method A 132) for predetermined code metrics for use in determining whether the code segment is overlong. For example, a metric module 114A may assess the input code segment to determine if the code segment is autogenerated or not, such as by automatically searching the code segment comment(s) for an "autogenerated" reference or the like. In addition or in the alternative, a metric module 114A may be configured to use an NLP or machine learning process to determine if the code segment is a test method or normal method, such as by automatically searching the code segment name or annotations for a "test" reference or the like, thereby classifying the code segment as a "test" segment (which is less likely to have functional errors) or a "normal" segment (which is more likely to have functional errors). In addition or in the alternative, a metric module 114A may be configured to identify any anonymous or local classes on the code segment and to determine the total length of such classes in the code segment, such as by automatically invoking a code analysis tool (e.g., Understand) to analyze the code segment to identify anonymous/local class lines which will be excluded from the effective code length computation for the code segment. In addition or in the alternative, the metric module 114A may be configured to determine other code metrics, such as the maximum nesting level, modified cyclomatic complexity, or statement count of the code segment, such as by using Understand or similar integrated development environment tools.

Once the predetermined code metrics measures are extracted from an input code segment, the long method finder service 114 may be further configured to identify or retrieve a plurality of code length limit threshold values 114B from memory 112 and/or from the knowledge base 130. For example, the code length limit threshold values 114B may include a first tailored set of code length thresholds for application against identified test methods, such as a lower test limit (e.g., Test_Method_Length Lower_Limit or "TMLLL"), upper test limit (e.g., Test_Method_Length_Hard_Limit or "TMLHL"), and/or statement count limit (e.g., Test_Method_Statement_Threshold or "TMST"). In addition, the code length limit threshold values 114B may include a second tailored set of code length thresholds for application against identified regular or normal methods, such as a lower normal threshold value (e.g., Method_Length_Lower Limit or "MLLL"), upper normal threshold value, (e.g., Method_Length_Hard_Limit or "MLHL"), and/or normal statement count limit (e.g., Method Statement Count Threshold or "MSCT"). The code length limit threshold values 114B may also include additional code length threshold limits, such as an upper limit cyclomatic complexity (e.g., Cyclomatic_Complexity_Threshold or "CCT") and/or upper limit for maximum nesting (e.g., Max_Nesting_Limit or "MNL"). As will be appreciated, the values of the code length limit threshold values 114B are configurable by the program developer 101 to provide differentiated treatment to different types or classes of code segments.

With the code metrics and thresholds retrieved, the long method finder service 114 may be further configured to apply the long method detection rules 135 as a heuristic engine to identify the overlong code segments or methods 136 (e.g., Method B 133) from the input source code segments 131. To this end, the long method finder service 114 may apply a filter detection rule 135 to filter the autogenerated code segment(s) and/or any portion(s) of code segment(s) that are anonymous or local classes from consideration as an overlong code segment. For example, the filter detection rule 135 may be applied to determine that an autogenerated method is not, by definition, an overlong method. In addition or the in alternative, the filter detection rule 135 may be applied to measure the effective code line length of a method by removing the number of lines for any anonymous or local class from the computed code line length for a method. In addition, the long method finder service 114 may apply a first comparison detection rule 135 to detect overlong normal methods by comparing the effective code line length $L_{EFF}$ for a normal method to lower and upper normal threshold values (e.g., MLLL and MLHL) so that any normal method is identified as overlong if either (1) its effective code line length $L_{EFF}$ exceeds the upper normal threshold value MLHL, or (2) its effective code line length $L_{EFF}$ exceeds the lower normal threshold value MLLL and a plurality of additional code length metric measures (e.g., normal statement count, modified cyclomatic complexity, maximum nesting) exceed corresponding threshold limits (e.g., MSCT, CCT, and MNL). The long method finder service 114 may also apply a second comparison detection rule 135 to detect overlong test methods by comparing the effective code line length $L_{EFF}$ for a test method to lower and upper normal threshold values (e.g., TMLLL and TMLHL) so that any test method is identified as overlong if either (1) its effective code line length $L_{EFF}$ exceeds the upper test threshold value TMLHL, or (2) its effective code line length $L_{EFF}$ exceeds the lower test threshold value TMLLL and a plurality of additional code length metric measures (e.g., normal statement count, modified cyclomatic complexity, maximum nesting) exceed corresponding threshold limits (e.g., TMST, CCT, and MNL).

As will be appreciated, the performance and accuracy of the long method finder service 114 and applied long method detection rules 135 will depend on the values of the different code length threshold limits. For example, the code length threshold limits used to assess normal methods may be set to smaller values than the code length threshold limits for test methods since test methods are less likely to have code-length related errors. For similar reasons, the statement count threshold limits for normal methods should generally be smaller than the statement count threshold limits for test methods.

Once the overlong code segments or long methods 136 are identified or flagged, the server/computer system 110 may be configured to generate a list of codefix issues 137 in the knowledge database 130. To this end, the long method finder service 114 may include a long method reporting service 114C which generates a prioritized and/or batched listing of CodeFix issues 137 which identify the overlong code segments or methods 136. In selected embodiments, the reporting service 114C stores CodeFix issues as work-to-do entities in a relational storage database 130. Each CodeFix entity may have a state (pending/done) and may be managed by a human operator or program developer 101 through a web UI. In reporting the long methods as codefix issues, the long method reporting service 114C may prioritize the identified long methods 136 using any suitable prioritization arrangement to determine which identified long method(s) 136 should be fixed first.

In prioritizing the identified long methods 136, the long method reporting service 114C may be configured to calculate a "PRIORITY" value to determine which detected long method should be fixed first, such as by calculating the product of the number of statement lines in the method and one or more scaling factors, depending on whether the method is a test method. However generated, the "PRIORITY" values output may be stored along with other information relating to the identified long methods, and the reporting service 114C may also issue a report that provides the results of the long method detection analysis to the user in the form of a ranked list of overlong code segments, each identified by the code segment name, alone or in combination with information specifying the code segment's length, statement count, cyclomatic complexity, maximum nesting value, location of the code segment (e.g., starting and ending lines), and/or the name of the developer for the code segment. While the presentation of each report can be arranged in any suitable fashion to efficiently convey a prioritized ranking of overlong code segments along with related code length metric information, alone or in combination with analysis recommendations to reduce the code length of any identified code segments.

In addition or in the alternative, the long method reporting service 114C may be configured to group codefix issues into batches for improved performance and correctness. For example, batching issues based on method-file membership and batch size results in improved system performance when the same sandbox can be reused for multiple long methods. And by making sure that issues affecting same file are spread to different sandboxes, batching can ensure correctness when generating code with a refactoring library service that applies changes only to the AST layer of CodeGraph (which is the only one required for code generation by CodeGen) and not to other layers as well (Control Flow Graph) which can leave the CodeGraph in a partially-inconsistent state. Another benefit of batching issues is to normalize sandbox usage by limiting batches to a configurable size. In addition, PR acceptance rates are improved by not grouping more than one codefix issue per Pull Request.

To further assist with the identification and fixing of overlong code segments, the long method autofix engine 113 may include a long method fixer service 115 that is responsible for fixing CodeFix long method issues. In selected embodiments, the codefix issues 137 are provided as an input to the long method fixer service 115 which applies one or fixing algorithms 115A-B to generate a fixed output code 138 having shorter methods which replace the identified long methods. In selected embodiments, the fixed output code 138 is an edited CodeGraph sandbox containing the fixed code.

While any suitable extraction algorithm may be used to extract shorter methods from the identified long methods, the fixer service 115 may include a block and variable extraction module 115A which is configured to automatically identify an optimized method-split solution based on a combination of variable-driven candidates and block-driven candidates, thereby optimizing the number of extracted lines of code (LOC) from an identified long method. In selected embodiments, the block and variable based extraction module 115A is operative to extract method refactoring opportunities which are related with the complete computation of a given variable (complete computation slice) and the statements affecting the state of a given object (object state slice), and to avoid extracting incomplete loops, switches, and/or try/catch blocks. The block and variable based extraction module 115A may also validate extraction candidates by filtering out low-quality candidates, such as by identifying candidates that have too many parameters, that are too big, and/or that are too small. The block and variable based extraction module 115A may also construct block-driven extraction candidates around lexical blocks (e.g., loops, if, etc.) and validate any identified candidates.

In addition or in the alternative, the fixer service 115 may include a variable cohesion based extraction module 115B which is configured to construct extraction candidates as graphs of clustered method variables and statements that use them, where the variables are clustered together if they depend on each other. In selected embodiments, the variable cohesion based extraction module 115B is operative to split extraction candidates around the biggest articulation points and/or around re-initializations of the same variable. In addition or in the alternative, the variable cohesion based extraction module 115B may normalize extraction candidates by normalizing graph holes (so that an extraction candidate is made up of consecutive statements), normalizing scopes (so that a graph does not contain an incomplete scope), normalizing candidate overlaps (to avoid extracting the same statements multiple times to different methods), and normalizing around jump-ish statements (to avoid breaking original method's logic). The variable cohesion-based extraction module 115B may also validate extraction candidates by filtering out low-quality candidates based on the number of parameters, required return values, etc.

Figure 2:
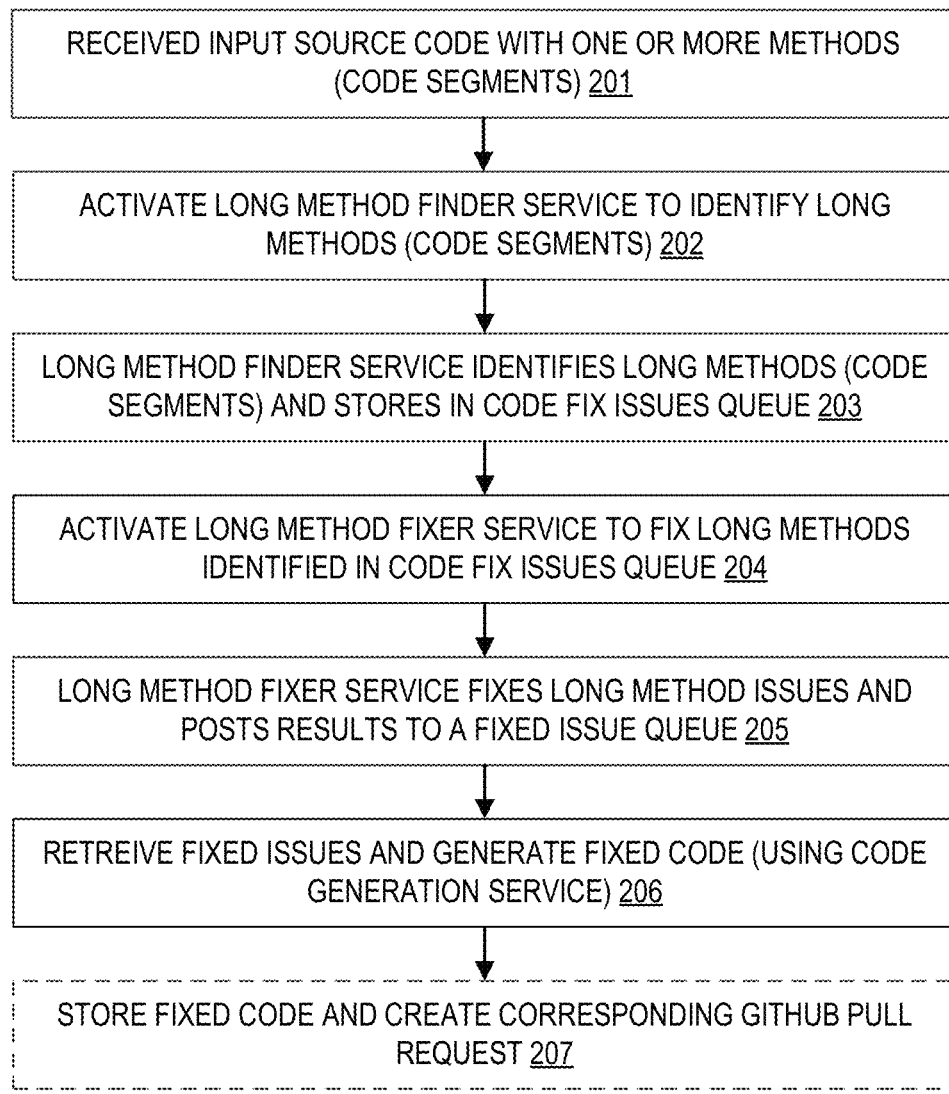
FIG. 2 illustrates a high-level execution flow chart showing the logic for detecting and fixing overlong methods in accordance selected embodiments of the present disclosure.

To provide additional details for an improved understanding of selected embodiments of the present disclosure, reference is now made to FIG. 2 which illustrates a high-level execution flow chart 200 showing the logic for detecting and fixing overlong methods. As will be appreciated, the depicted execution workflow 200 may be implemented in whole or in part with a data processing system (such as shown in FIG. 1) and/or a single integrated circuit (e.g., a system-on-chip) or a plurality of integrated circuits to implement one or more processors with local memory and database storage that are interconnected and interoperate using any suitable techniques without departing from the present invention. However implemented, the execution workflow 200 receives input source code (block 201) having one or more code segments (e.g., methods) which may be checked into the system as source code and binary files created by the program developer. An additional input to the detection work flow 200 is the threshold limit values that may be retrieved from the knowledge base or memory.

At step 202, the input source code is assessed by activating a long method finder service to identify any long method or code segments. As will be appreciated, the activation of the finder service may occur upon check-in to the execution work flow. In addition or in the alternative, an automated codefix system may include a scheduler which automatically invokes the long method finder service on a predetermined schedule by posting requests to the finder service. During activation, the input source code may be retrieved or loaded using a codegraph sandbox container to mount a copy or snapshot of the input source code as graph database structure.

At step 203, the activated long method finder service identifies long methods in the input source code for storage in a code fix issues queue 203. As will be appreciated, the activated finder service may employ any suitable code analysis tools to each code segment to determine if it is a long method or class that meets predetermined code metrics. Examples of suitable code assessment techniques include, but are not limited to, NLP processing to determine if the method is autogenerated, to determine if the method is a test method or normal method, to determine if the method includes anonymous or local classes, to determine the maximum nesting level of the method, to evaluate the modified cyclometric complexity of the method, and/or to determine a statement count for the method. In addition, the activated long method finder service may be configured to identify a long method by using a simple count of method LOC (or more sophisticated threshold-based counting analytics), to group identified long methods into batches that are optimized for performance and correctness, and to store them as code fix issues. For example, the processing to find long methods at step 203 may be performed by the long method finder service 114 which uses the metric modules 114A and method thresholds 114B to identify long methods which are passed to the long method reporting module 114C which generate a list of code fix issues 137, as shown in FIG. 1.

At step 204, the assessment of the input source code continues upon activation of a long method fixer service which applies one or more extraction algorithms to any long method or code segments identified as code fix issues. As will be appreciated, the activation of the fixer service may occur upon check-in to the execution work flow and/or upon any predetermined or scheduled basis, such as when a scheduler at an automated codefix system automatically invokes the long method fixer service by posting requests to the fixer service.

At step 205, the activated long method fixer service fixes the long methods identified in the list of code fix issues and posts the results to a fixed issues queue or list. As will be appreciated, the activated fixer service may employ any suitable combination of code fragment extraction tools to each identified long method or code segment to splitting them into smaller methods/segments. Examples of suitable code fragment extraction techniques include, but are not limited to, applying a combination of block and variable based extraction algorithm and a variable-cohesion based extraction algorithms for splitting long methods into smaller methods until all new methods are sufficiently small or no more splitting can be done. The resulting fixes to the input source code may be posted to a fixed issues queue. In addition, the activated long method fixer service may be configured to fix long methods by processing the identified methods in parallel.

In selected embodiments, the processing at step 205 may use a first fixing algorithm that performs a block and variable based extraction process to compute an optimized method-split solution based on a combination of variable-driven candidates and block-driven candidates, thereby generating a smaller method having an optimized number of extracted lines of code from the originally identified long method. In the block and variable based extraction process, an initial set of variable-driven extraction candidates may be constructed around single variable and parameter usages, such as by identifying candidates from all statements that access a specified variable(s)/parameter(s). The candidates may also be expanded by adding additional method statements. For example, the additional statements may include all statements that have a dependency on any other statements of the candidate, such as by using a backward slicing process. In addition, the additional statements may include any statements that are required to avoid extracting in incomplete loops, switches, try/catch blocks. The additional statements may include statements that are required to avoid missing object-altering statements, such as by using a variable balancer process. Once the expanded candidate statements are assembled, a filtering process may be applied to validate the extraction candidates by removing low quality candidates. The filtering process may evaluate each candidate to determine if there are too many parameters (e.g., exceeds a parameter threshold), or if the candidate method is too small or too big, and the like. The block and variable based extraction process may also construct block-driven extraction candidates around lexical blocks (e.g., loops, if statements, etc.) which are also validated to filter out low quality candidates.

As will be appreciated, the block and variable based extraction process has some weaknesses or limitations that can limit its usefulness in extracting smaller methods. For example, it can reorder the method statement order of execution in the original long method. In addition, block and variable based extraction processing is relatively slow since it depends on the performance of the graph database, sometimes taking 8-15 minutes for a method having 200 lines of code. Another drawback is that block and variable based extraction processing cannot efficiently handle jump-ish statements (return, continue) as extracting methods containing these statements requires some restructuring of code.

In addition or in the alternative, the processing at step 205 may use a second fixing algorithm that performs a variable-cohesion based extraction process to construct extraction candidates as graphs of clustered method variables and statements that use them. In the variable-cohesion based extraction process, variables are clustered together if they depend on each other. In addition, the variable-cohesion based extraction processing may split extraction candidates around the biggest articulation points which, if removed, will make the graph disconnected. Extraction candidates may also be split around re-initializations of the same variable since each variable re-initialization can be considered a declaration of a new variable, thus leading to a separate candidate graph. In addition, the variable-cohesion based extraction processing may normalize extraction candidates using any suitable normalization process. For example, graph holes may be normalized so that an extraction candidate is made up of consecutive statements, such as by splitting the candidate or by adding missing statements. In addition, scopes may be normalized so that a graph does not contain an incomplete scope. In addition, candidate overlaps may be normalized to avoid extracting the same statements multiple times to different methods. In addition, the normalization process may normalize around jump-ish statements (return, break, continue, etc.) to avoid breaking the original (long) method's logic. Once the variable-cohesion based candidate statements are assembled, a filtering process may be applied to remove low quality candidates. The filtering process may evaluate each candidate to determine if there are too many parameters (e.g., exceeds a parameter threshold) or required return values.

As will be appreciated, the variable-cohesion based extraction process has some weaknesses or limitations that can limit its usefulness in extracting smaller methods. For example, it is inefficient if the variables are used throughout the method, as it will fill the candidate holes and create a big method to extract, which might get filtered out. In addition, if there is a small region of code that uses many variables, the variable-cohesion based extraction process will create a method with too many parameters and might therefore be filtered out. In addition, the way the variable-cohesion based extraction process handles jump-ish statements can create low-value candidates that will be filtered out, leading to a low extraction rate. However, in contrast, to block and variable extraction, variable-cohesion based extraction processing is significantly faster, at around 1-2 minutes per method.

At step 206, the list of fixed issues is retrieved from the fixed issues queue and used by the long method fixer service to generate the fixed code. As will be appreciated, the fixed code may be generated using a code generation service which outputs an edited CodeGraph sandbox containing the fixed output code. Alternatively, any suitable refactoring library service may be used to apply changes to the CodeGraph sandbox instead of directly modifying the input source code. For example, the processing to fix long methods at step 205 may be performed by the long method fixer service 115 which uses the block and variable based extraction algorithm 115A and a variable-cohesion based extraction algorithm 115B to output an edited CodeGraph sandbox containing the fixed output code 138, as shown in FIG. 1. The resulting code must be semantically equivalent.

At step 207, additional processing may optionally be performed (as indicated with the dashed lines). For example, the fixed code may be stored in memory, such as Amazon Simple Storage Service (S3) cloud storage. In addition, the processing at step 207 may include an optional creation of a GitHub Pull Request to provide notification about the changes to the input source code that are pushed to a branch in a repository on GitHub.

As described in connection with the high-level execution flow chart 200 shown in FIG. 2, the core approach for detecting and fixing overlong methods may be embodied in a long method autofix subsystem which is constructed with two web services which each have a different responsibility. In particular, a finder service may be invoked to identify long methods using a CodeGraph sandbox as an input and outputting codefix issues which are stored as entities. For example, a codefix issue may be a work-to-do entity that is stored in a relational storage and that has a state (e.g., pending/done) that can be managed by a human operator through a web UI. In addition, a fixer service may be invoked to fix previously identified codefix long method issues using the codefix issues as an input and outputting an edited CodeGraph sandbox containing the fixed code.

Figure 3:
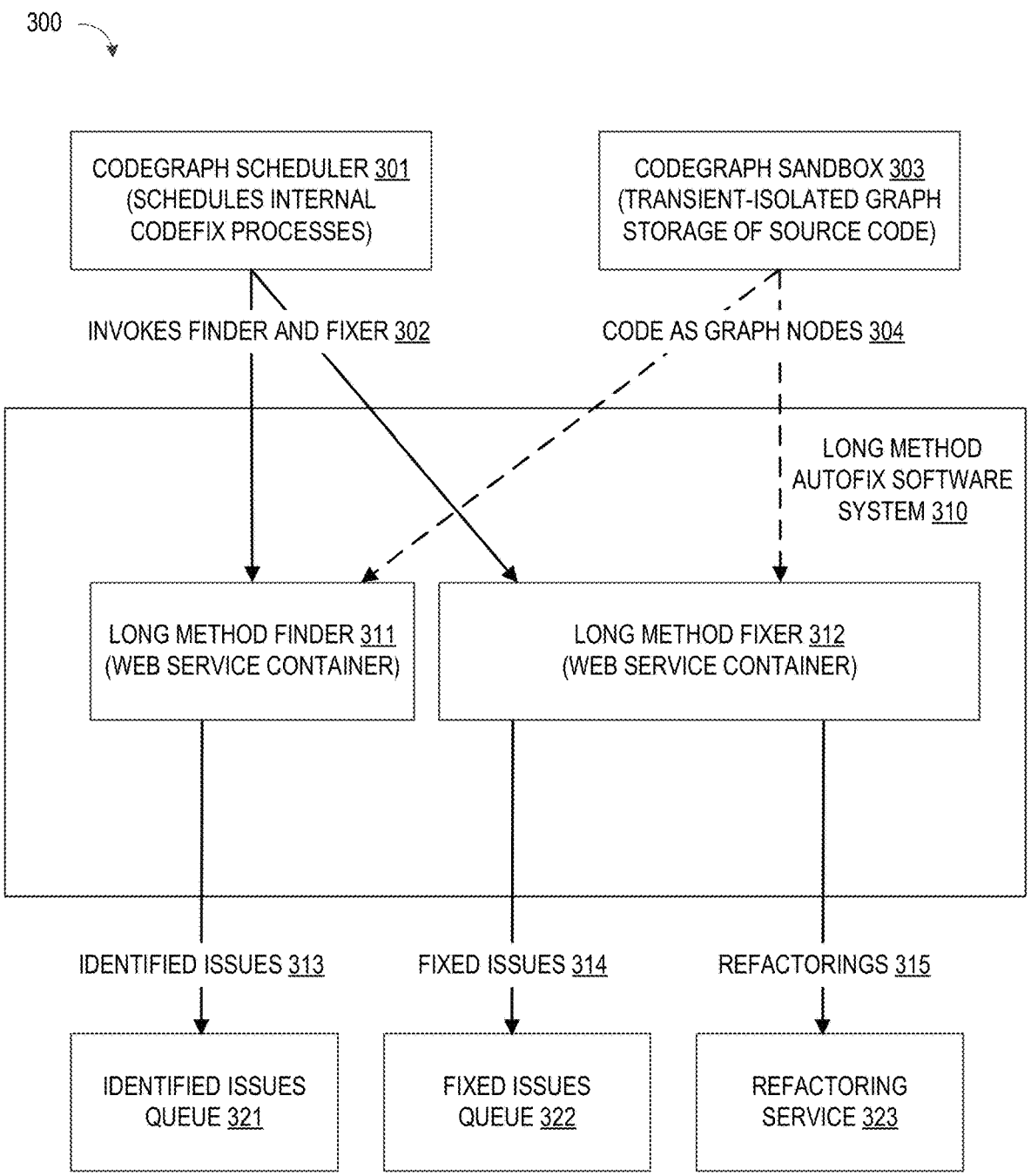
FIG. 3 is a block diagram illustration of functional components of a codefix system for automatically fixing long methods in accordance selected embodiments of the present disclosure.

To provide additional details for an improved understanding for selected embodiments of the present disclosure, reference is now made to FIG. 3 which is a block diagram illustration of the functional components of a codefix system 300 for automatically fixing long methods. As shown in FIG. 3, the codefix system 300 includes a long method autofix software system 310 that may include one or more processing modules 311, 312 that are configured to detect and fix long methods by splitting them into smaller methods. In selected embodiments, the long method autofix software system 310 implements a first finder service 311 that is configured to automatically identify long methods in a codegraph sandbox representation 303 of the code repo being analyzed and to output identified issues 313 to the identified issues queue 321. In selected embodiments, the finder service 311 may be invoked or scheduled to process the codegraph sandbox input 304 by identifying long methods in the code repo, grouping them into batches, optimizing the batches for performance and correctness, and then storing them as identified issues 313. In selected embodiments, the finder service 311 may identify long methods using a simple line count method LOC, or by using one or more filters and tailored code length thresholds to different code segments. In addition, the finder service may be configured to batch or group identified issues to improve performance and correctness, such as by batching issues based on method-file membership and batch size. Such batching improves performance by allowing re-use of the same sandbox for multiple long methods. In addition, batching ensures correctness when generating code since issues affecting same file are spread to different sandboxes. Concerns about correctness in the generated output code arise in cases where the refactoring service 323 applies changes only to the AST layer of CodeGraph 303 and not to other layers as well (e.g., Control Flow Graph), thereby leaving the CodeGraph in a partially-inconsistent state. Batching also normalizes sandbox usage by limiting batches to a configurable size.

In addition, the long method autofix software system 310 implements a second fixer web service 312 that is configured to automatically fix previously identified long method issues 313 stored in the identified issues queue 321. In selected embodiments, the fixer service 312 may be invoked or scheduled to fix long method issues by taking as input previously identified issues 313 and processing the contained long methods occurrences in parallel using one or more extraction algorithms selected from a group consisting of a block and variable algorithm and a variable-cohesion algorithm. The benefit of fixing batched long methods in parallel arises in cases where each batch size is limited and all batched long methods refer to different files per sandbox, in which case the batched issues can be fixed concurrently or in parallel (e.g., 1 issue per thread). In cases where the implemented extraction algorithms are comparable to each other in terms of overall extraction performance (e.g., one algorithm may perform extraction better than the other at times), the long method autofix software system 310 may advantageously employ both extraction algorithms in an alternating fashion so that one algorithm is used for a first code fix issue and the other algorithm is used for the next code fix issue, and so on. In selected embodiments, the Java library JDeodorant extraction algorithm is not used since it provides inferior performance and is not maintained anymore.

In the depicted codefix system 300, the long method autofix software system 310 is connected to receive the codegraph scheduler 301 as an input software system which sends commands 302 to activate or invoke the operation of the long method autofix software system 310, such as by invoking the finder and fixer services 311, 312 on a predetermined basis or schedule. In addition, a codegraph sandbox 303 is connected as an input software system to provide or load the input source code 304 in graph format to the finder and fixer services 311, 312 (and not as text files) so that the long method autofix software system 310 can work with the input source code as a transient-isolated graph storage format. In embodiments where the long method autofix software system 310 is connected to receive and process the input source code as graph nodes 304 in the input codegraph sandbox 303, the software system 310 can employ graph-processing algorithms 311, 312 that work on code syntax, data dependencies, control flow, and the like, instead of implementing algorithms over text files which would require code parsing and processing logic. The resulting outputs 313-315 from the codefix system 300 include a listing of identified codefix issues 313 that are stored in the identified issues queue 321, along with a listing of fixed issues 314 that are stored in the fixed issues queue 322. In addition, the codefix system 300 generates refactorings output 315 for output to a refactoring service 323 which is used to modify the input source code. In selected embodiments, the refactoring service 323 may implemented by invoking a refactoring library service to make edits to the CodeGraph sandbox instead of directly modifying the code, thereby reducing development costs.

As will be appreciated, the programmed functionality of the long method autofix software system 310 may be configured and adapted, depending on the types of long method issues being identified and fixed. For example, the algorithms in the long method autofix software system 310 may be configured to extract only methods with 0/1 return value and with a small number of parameters in applications where other developers will be working on the extracted code. With this extraction configuration limitation, the autofix software system 310 does not extract methods that would lead to bad object-oriented design. For example, methods with too many parameters are difficult to work on, and would therefore not be extracted. In addition, this extraction configuration limitation would avoid extracting poorly designed code which encapsulates variables in a class and uses it as a return value, as the encapsulated variables have no logical meaning grouped together. In another example of configuring the algorithms in the long method autofix software system 310, a filtering process may be applied to prevent extraction of small methods below a certain size threshold. With this extraction configuration limitation, the autofix software system 310 does not extract methods with a size less than a configurable threshold, thereby discarding extraction solutions that would lead to small methods.

Additional performance benefits may be achieved by configuring the long method autofix software system 310 to extract methods to the same class. For example, the long method fixer service 312 may optimize method reuse by placing extracted method in the same class as the original long method, instead of extracting them to utility classes. In addition, the long method autofix software system 310 may be configured to use file-based references (in addition to or in place of using node IDs) when referring to identified long methods or issues 313, fixed long methods/issues 314, or refactorings 315. Using file based references will help any human operator who might intervene to work on long method issues if they use a file reference (file, start and end lines) instead of node ids which are unknown to the user.

The programmed functionality of the long method autofix software system 310 may also be configured and adapted to identify block parameters and return values using CodeGraph's binding graph which stores relationships between variables and statements that uses them. Reusing the pre-computed binding graph is better than in-place building of binding information, required to get the list of variables and/or class fields that are used in the block but declared in an outer block/class. In addition, the long method autofix software system 310 may be configured to iteratively compute a required exception list when extracting methods by navigating the AST. In cases where the CodeGraph sandbox 303 does not store explicit exception information, the extraction process may iteratively compute relevant exceptions that are needed to add to new method's signature. The computed exception list is the union of (a) exceptions thrown by the extracted block, caught in the outer blocks up to method level, and (b) exceptions declared in the containing method signature.

As will be appreciated, the modules and systems of the depicted codefix system 300 represent a set of executable software instructions which are executed in hardware (e.g., memory and processor) on one or more web servers. However, to avoid obscuring the description with unnecessary detail, various functional modules and systems that are not germane to conveying an understanding of the present disclosure have been omitted. As such, persons skilled in the art will recognize that additional functional modules and systems may be used with the codefix system 300 to facilitate additional functionality that is not specifically described herein. Furthermore, the various functional modules and systems depicted in FIG. 3 may reside on a single web server computer, or may be distributed across several server computers in various arrangements. Moreover, although the long method autofix software system 310 is depicted as a single software system block, the long method autofix software system is not limited to such an architecture. It is contemplated that other types of architecture are within the scope of the present disclosure.

Figure 4:
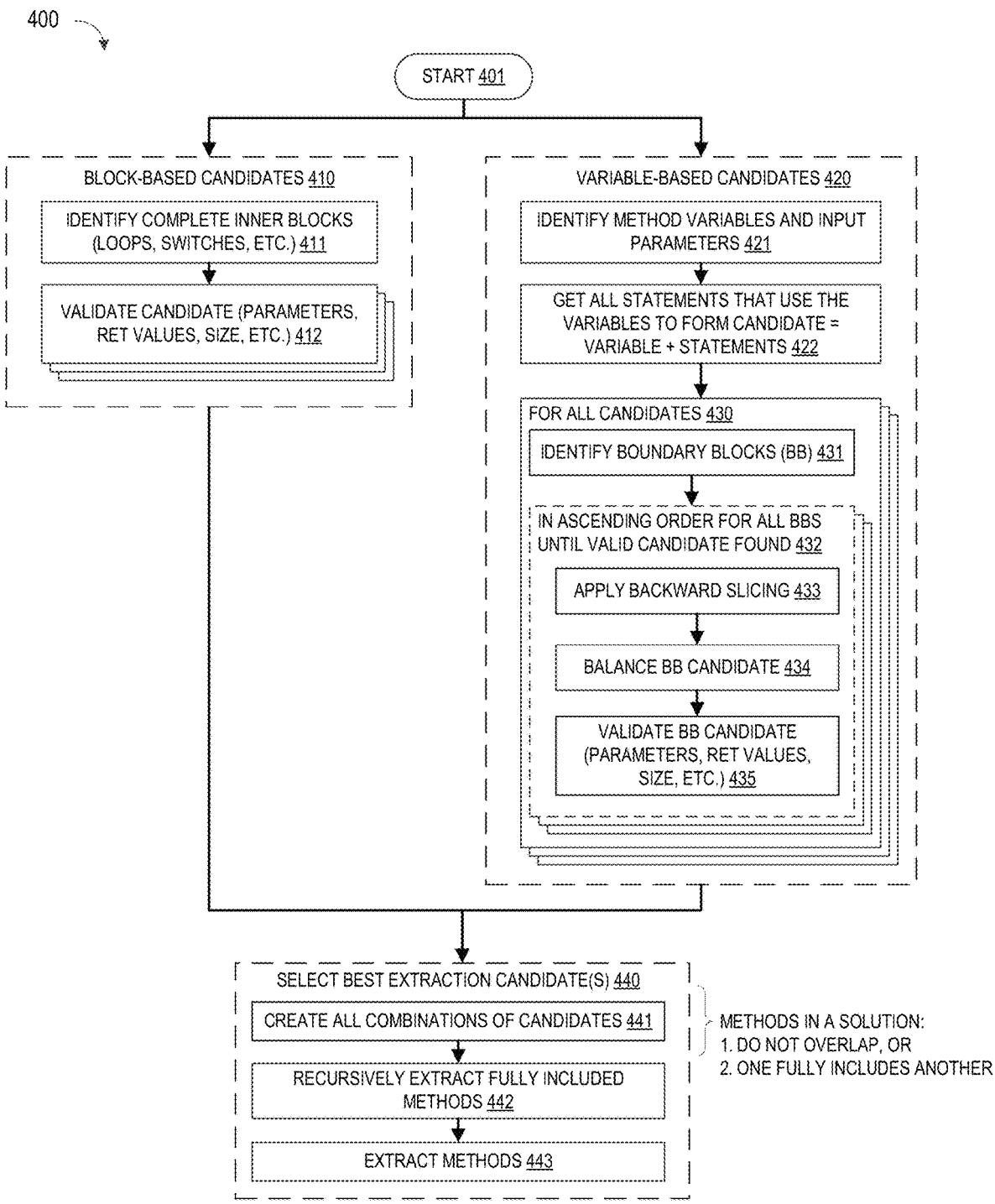
FIG. 4 illustrates a simplified flow chart showing the logic for implementing block and variable based extraction in accordance selected embodiments of the present disclosure.

To provide additional details for an improved understanding of selected embodiments of the present disclosure, reference is now made to FIG. 4 which illustrates a simplified flow chart 400 showing the logic for implementing block and variable based extraction which may be implemented by the long method autofix engine. As will be appreciated, the depicted processing flow 400 may be implemented in whole or in part with a data processing system (such as shown in FIG. 1), a single integrated circuit (e.g., a system-on-chip), or a plurality of integrated circuits to implement one or more processors with local memory and database storage that are interconnected and interoperate using any suitable techniques without departing from the present invention. However implemented, the processing flow starts at step 401 upon invocation or activation of the long method autofix process for evaluation a received input source code having one or more code segments (e.g., methods) which may be checked into the system as source code and binary files created by the program developer. The startup of the block and variable based extraction processing flow at step 401 may occur on a predetermined autofix schedule, and/or may alternate with the startup of the variable-cohesion based extraction processing, as described below with reference to FIG. 5. Upon start up, the long method autofix engine may be configured to identify or retrieve input data, such as the code fix issue list and the graph database structure sandbox representation of the input source code, from memory and/or from the knowledge base. In addition, the memory may be configured with an output graph database structure sandbox for storing the fixed code that is generated by the long method autofix engine.

Proceeding in parallel down a block-based candidate extraction path 410 and variable-based candidate extraction path 420, the block and variable based extraction processing flow 400 selects the best extraction candidates 440 as the union of block-based candidates 410 and variable-based candidates 420. To identify block-based extraction candidates 410, extraction processing starts by retrieving or accessing the input codegraph sandbox to identify complete inner blocks (e.g., loops, switches, etc.) of each long method identified in the codefix issue list (step 411). Each complete loop is then evaluated as a potential candidate using any suitable validation process (step 412). For example, the candidate validation process at step 412 may filter out or discard any block-based candidate that has more than a maximum parameter threshold count (e.g., more than 6 parameters). In addition or in the alternative, any block-based candidate that has more than one required return value may be discarded. In addition or in the alternative, any block-based candidate that is too small (e.g., has a length that fails to meet a minimum line count threshold) may be discarded. In addition or in the alternative, any block-based candidate that is too big (e.g., has a length that exceeds a maximum line count threshold) may be discarded. In addition or in the alternative, the validation processing step may discard any block-based candidate that contains a jump statement (e.g., return, continue or break) that is not encompassed inside the block-based candidate.

To identify variable-based extraction candidates 420, extraction processing starts by retrieving or accessing the input codegraph sandbox to identify method variables and input parameters of each long method identified in the codefix issue list (step 421). Using the identified method variables and parameters, extraction candidates are identified by getting all statements that use the variables so that each variable along with its usage statements is an extraction candidate (step 422). At step 430, each candidate is processed at step 431 to identify any boundary blocks (BB), where a boundary block is a lexical block (or a scope) that fully encompasses a variable (e.g., its declaration and all usages). At step 432, each boundary block is evaluated in ascending order to apply backward slicing (step 433) which adds all statements that have a data dependency or a control dependency on any statements of the candidate. In addition, each boundary block candidate is balanced at step 434 to add any required balancing statements. For example, if there are statements that are part of a loop, the balancing step 434 adds all other loop statements. In addition or in the alternative, if there are statements that are part of a switch, the balancing step 434 adds all other switch statements. In addition or in the alternative, if there are statements that are part of a try or catch, the balancing step 434 adds all other try or catch statements. In addition or in the alternative, if there are statements that use variables of type object that have a data dependency on any of the other candidate's variable, the balancing step 434 performs object access balancing to add such statements. Each boundary block candidate is then evaluated as a potential candidate using any suitable validation process (step 435). For example, the candidate validation process at step 435 may filter out or discard any boundary block candidate that has more than a maximum parameter threshold count (e.g., more than 6 parameters). In addition or in the alternative, any boundary block candidate that has more than one required return value may be discarded. In addition or in the alternative, any boundary block candidate that is too small (e.g., has a length that fails to meet a minimum line count threshold) may be discarded. In addition or in the alternative, any boundary block candidate that is too big (e.g., has a length that exceeds a maximum line count threshold) may be discarded. In addition or in the alternative, the validation processing step may discard any boundary block candidate that contains a jump statement (e.g., return, continue or break) that is not encompassed inside the boundary block candidate.

At step 440, the best extraction candidates are selected, such as by identifying solutions that maximize the number of statements extracted from the identified long method. The selection process 440 starts by identifying potential solutions, where each solution is the list of methods to be extracted. To this end, the processing at step 441 creates all combinations of candidates that do not overlap, or if they overlap, the statements of one candidate are fully contained in the other candidate. At step 442, all candidates fully included in other candidates are recursively extracted with an extraction process that does not re-apply the full extraction algorithm. And at step 443, the methods are extracted that correspond to the selected "best" extraction candidate. For example, method extraction processing at step 443 may include computing an exception list by analyzing try/catch block and declared exception at method level.

Figure 5:
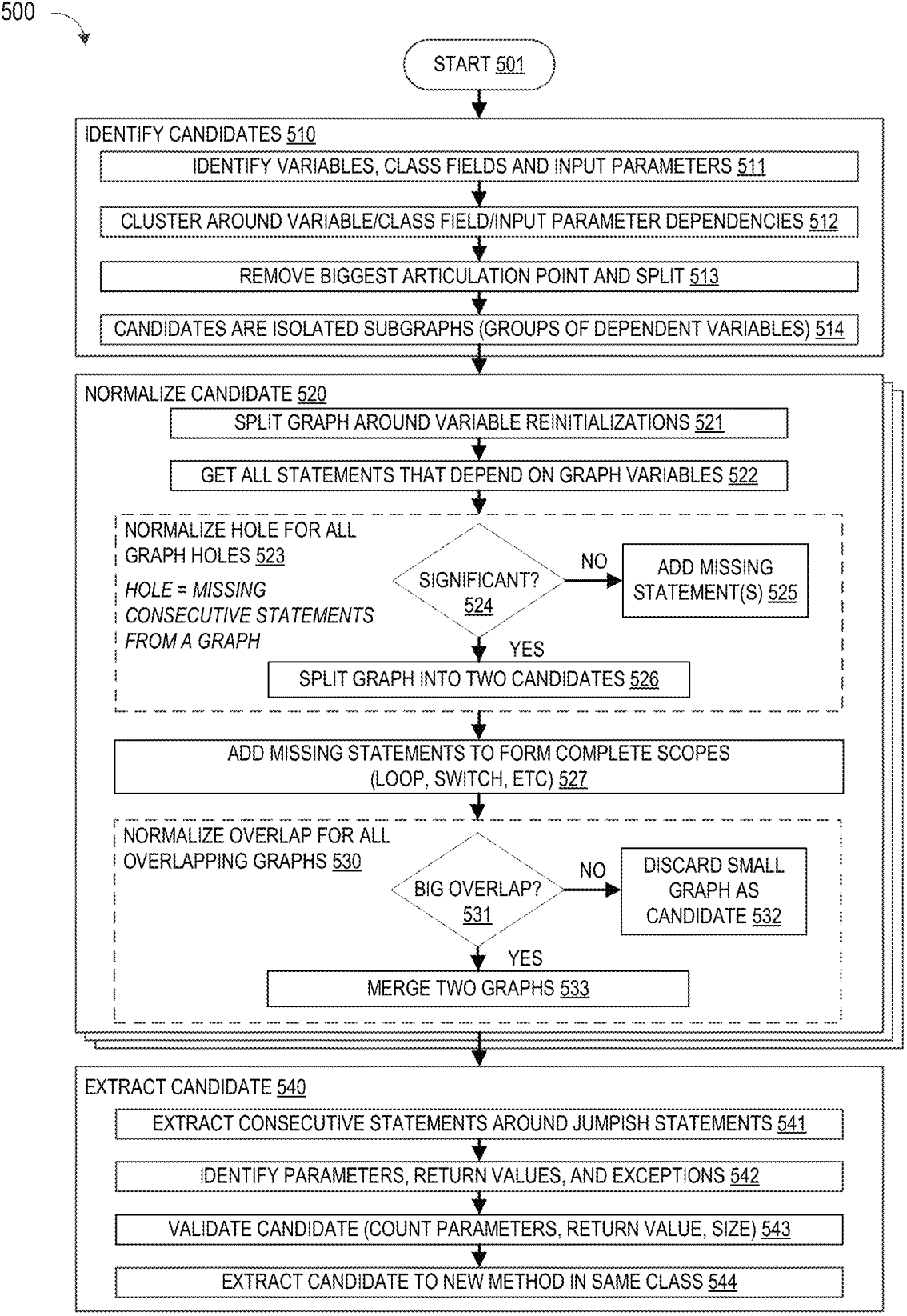
FIG. 5 illustrates a simplified flow chart showing the logic for implementing variable cohesion-based extraction in accordance selected embodiments of the present disclosure.

To provide additional details for an improved understanding of selected embodiments of the present disclosure, reference is now made to FIG. 5 which illustrates a simplified flow chart 500 showing the logic for implementing variable cohesion-based extraction which may be implemented by the long method autofix engine. As will be appreciated, the depicted processing flow 500 may be implemented in whole or in part with a data processing system or integrated circuit(s) to implement one or more processors with local memory and database storage that are interconnected and interoperate using any suitable techniques without departing from the present invention. However implemented, the processing flow starts at step 501 upon invocation or activation of the long method autofix process for evaluation a received input source code having one or more code segments (e.g., methods). The startup of the variable-cohesion based extraction processing flow at step 501 may occur on a predetermined autofix schedule, and/or may alternate with the startup of the block and variable based extraction processing, as described herein with reference to FIG. 4. Upon start up, the long method autofix engine may be configured to identify or retrieve input data, such as the code fix issue list and the graph database structure sandbox representation of the input source code, from memory and/or from the knowledge base. In addition, the memory may be configured with an output graph database structure sandbox for storing the fixed code that is generated by the long method autofix engine.

Once started, the variable-cohesion based extraction processing identifies extraction candidates 510 by retrieving or accessing the input codegraph sandbox to identify variables, class fields, and the method input parameters of each long method identified in the codefix issue list (step 511). Using the identified method variables, class fields, and method input parameters, extraction candidates are identified by creating a cluster graph around the variable/class field/parameter dependencies (step 512), thereby mapping how each variable depends on other variable(s). At step 513, one or more clusters are split by identifying and removing the biggest articulation point which is a node in the graph that, if removed, will disconnect the graph. At step 514, the extraction candidates are identified as the fully isolated subgraphs using a standard "connected components algorithm."

Each candidate (sub) graph is normalized using any suitable normalization process (step 520). For example, the candidate normalization process 520 may start at step 521 by splitting candidate subgraphs around any variable reinitialization (step 521), such as by splitting subgraphs that have multiple re-initializations for the same variable. After splitting the subgraph, the process finds all statements that depend on variables in the subgraph (step 522). At step 523, graph holes in a candidate are normalized. For example, in a graph that contains statements on line 1, 2 and 7, 8, there is a hole at lines 3-6 where there are missing consecutive statements. During hole normalization, the processing step 523 determines if the hole is significant (step 524). If the hole is above a certain size threshold (affirmative outcome to detection step 524), then the hole is significant, and the candidate graph is split into two candidates (step 526). However, if the hole is not above the size threshold (negative outcome to detection step 524), then the hole is not significant, and missing statements are added to the current candidate graph to fill in the hole (step 525). In addition or in the alternative, the extraction candidates may be normalized for scope at step 527 by identifying and processing graphs that contain statements from different scopes or lexical blocks. For example, the scope processing at step 527 may add statements required to create complete lexical blocks, where the additional statements may be part of another graph. In addition or in the alternative, the extraction candidates may be normalized for overlap at step 530. For example, the overlap processing at step 530 determines if the overlap is significant (step 531). If the overlap is above a certain overlap threshold (affirmative outcome to detection step 531), then the overlap is big, and the overlapping graphs are merged (step 533). However, if the overlap is not above the overlap threshold (negative outcome to detection step 531), then the overlap is not big, and the smaller graph is discarded and the larger graph is picked as the current candidate graph (step 532).

The normalized candidates are processed to filter, validate, and extract candidates (step 540). As a preliminary step, the candidates are processed at step 541 to identify graphs that have jump-ish statements (return, break, continue, etc.), such as by identifying and extracting all consecutive statements and extract them as a graph. Each candidate is then evaluated as a potential candidate using any suitable validation process. For example, the candidates are evaluated to identify parameters, return values, and exceptions in each candidate (step 542) and then compared to one or more count thresholds (step 543). For example, the validation process at step 543 may filter out or discard any candidate that has more than a maximum parameter threshold count (e.g., more than 6 parameters). In addition or in the alternative, any candidate that has more than one required return value may be discarded. And at step 544, the candidates are extracted by computing an exception list by analyzing try/catch block and declared exception at method level, and then extracting all remaining candidates as methods in the same class.

Figure 6:
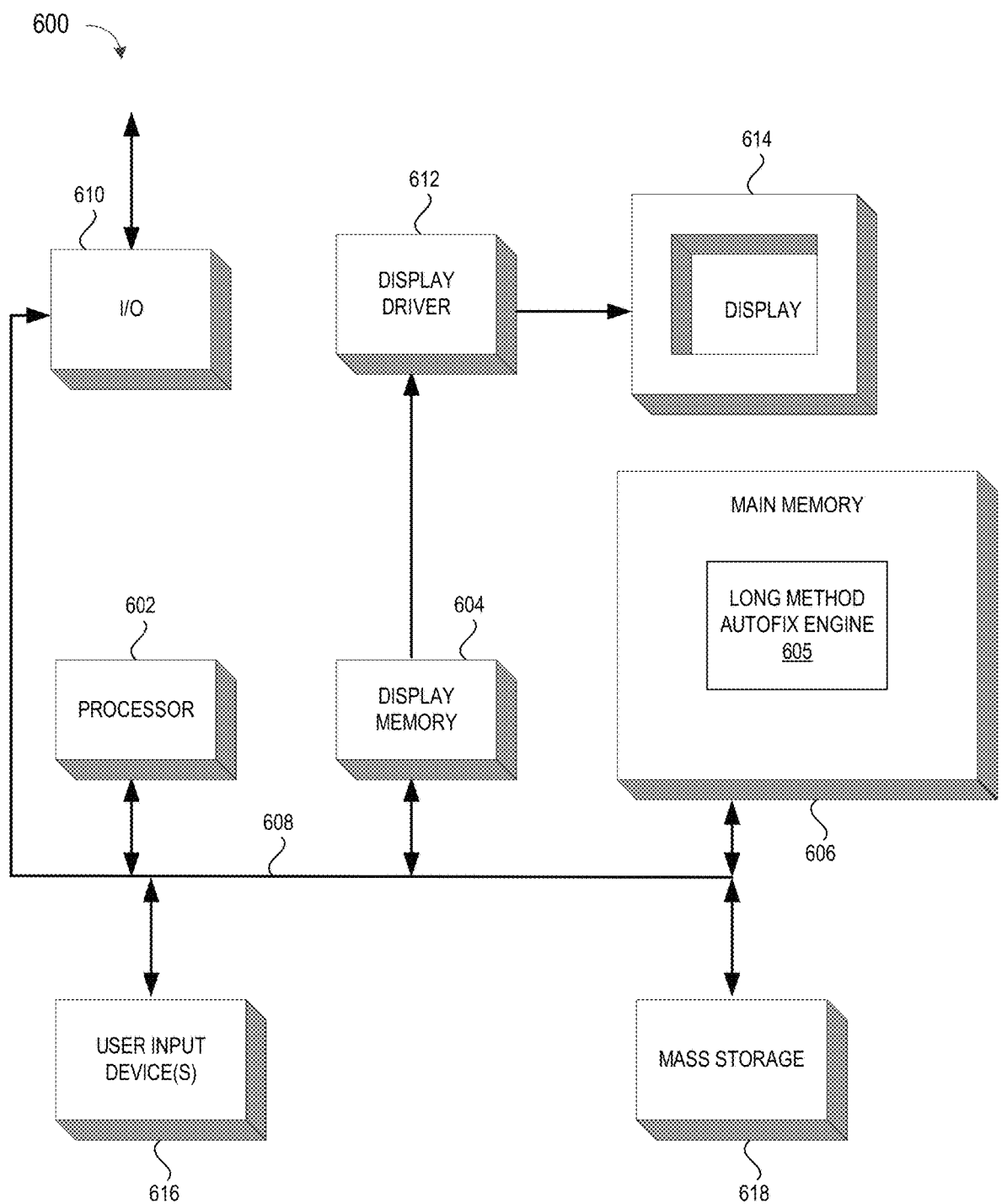
FIG. 6 is a simplified block diagram of a general-purpose computer for executing a long method autofix engine in accordance with selected embodiments of the present disclosure.

Embodiments of the system and method for automatically fixing overlong code segments can be implemented on a computer system, such as a general-purpose computer 600 illustrated in FIG. 6. As disclosed the computer 600 includes input user device(s) 616, such as a keyboard and/or mouse, which are coupled to a bi-directional system bus 608. The input user device(s) 616 are used for introducing user input to the computer system 600 and communicating that user input to processor 602. The computer system 600 may also include a display memory 604, main memory 606, and mass storage 618, all coupled to bi-directional system bus 608 along with input user device(s) 616 and processor 602. The mass storage 618 may include both fixed and removable media, such as other available mass storage technology. Bus 608 may contain, for example, 32 address lines for addressing display memory 604 or main memory 606. The system bus 608 may also include, for example, an n-bit data bus for transferring data between and among the components, such as CPU 602, main memory 606, display memory 614, and mass storage 618, where "n" is, for example, 32 or 64. Alternatively, multiplex data/address lines may be used instead of separate data and address lines.

The computer 600 may also include I/O device(s) 610 which provide connections to peripheral devices, such as a printer, and may also provide a direct connection to remote server computer systems via a telephone link or to the Internet via an ISP. I/O device(s) 610 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 618 until loaded into main memory 606 for execution. Computer programs may also be in the form of electronic signals modulated in accordance with the computer program and data communication technology when transferred via a network. The method and functions relating to system and method for applying a one or more filters and tailored code length thresholds to each code segment in the submitted source code and to eliminate certain code segments as long segment candidates by extracting shorter code segments having equivalent semantic functionality may be implemented in a computer program for a long method detection engine 605.

The processor 602, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 606 is comprised of dynamic random access memory (DRAM). Display memory 604 is a dual-ported random access memory. One port of the memory 604 is coupled to display amplifier or driver 612. The display amplifier/drive 612 is used to drive the display 614. Display amplifier/drive 612 is well known in the art and may be implemented by any suitable means. This circuitry converts pixel data stored in display memory 604 to a raster signal suitable for use by display 614. Display 614 is a type of monitor suitable for displaying graphic images.

By now, it will be appreciated that there is disclosed herein a system, method, apparatus, and computer program product for enhancing operable functionality of a software program by performing a method at a device having a processor and memory for eliminating long segments in the software program. As disclosed, the system, method, apparatus, and computer program receive a codegraph representation of the software program comprising a plurality of input source code segments. In selected embodiments, the codegraph representation is received from a codegraph sandbox container running a Neo4J graph engine mounting a copy of the codegraph representation of the software program. Subsequently, the device evaluates the codegraph representation of the software program to identify at least a first long code segment from the plurality of input source code segments based on a plurality of predetermined code metric values. In selected embodiments, the codegraph representation is evaluated to identify at least the first long code segment comprises identifying and grouping any of the plurality of input source code segments exceeding a maximum length threshold into a batch that is optimized for performance and correctness before storing the batch into the codefix issue queue. In other embodiments, the codegraph representation is evaluated to identify at least the first long code segment by removing any of the plurality of input source code segments that meet a first code metric value to identify one or more candidate source code segments; assessing each of the one or more candidate source code segments against a second code metric value to identify a set of candidate source code segments that contain the second code metric value; and assessing the set of candidate source code segments against a first tailored set of code length thresholds to identify any overlong source code segment in the first set of candidate source code segments having a code length which meets or exceeds at least two of the first tailored set of code length thresholds. Subsequently, the devices outputs the first long code segment for storage in a codefix issue queue, such as by storing the first long code segment as a work-to-do entity in a relational storage. Subsequently, the device applies a plurality of extraction algorithms to at least the first long code segment to generate a second code segment that is semantically equivalent to and shorter than the first long code segment. In selected embodiments, a block and variable based extraction algorithm is applied to at least the first long code segment to generate a second code segment that is semantically equivalent to and shorter than the first long code segment. For example, the block and variable based extraction algorithm may be applied by identifying and validating a block-based candidate from the first long code segment; identifying and validating a variable-based candidates from the first long code segment; and selecting an extraction candidate from the block-based candidate and the variable-based candidate. In other embodiments, a variable-cohesion based extraction algorithm is applied to at least the first long code segment to generate a second code segment that is semantically equivalent to and shorter than the first long code segment. For example, the variable-cohesion based extraction algorithm may be applied by identifying an extraction candidate as a graph of clustered method variables from the first long code segment; normalizing the extraction candidate to eliminate graph holes, complete scopes and eliminate graph overlap; and identifying and validating each extraction candidate.

The present invention may be a system, a method, and/or a computer program product such that selected embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software uses a local or database memory to implement the data transformation and data structures so as to automatically identify and fix overlong code segments by refactoring long methods into shorter methods, thereby improving the quality and robustness of software, and generating more readable, reliable, smaller, and robust code with less effort. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium or media having computer readable program instructions thereon for causing a processor to carry out aspects of the present invention. Thus embodied, the disclosed system, a method, and/or a computer program product is operative to improve the design, functionality and performance of software programs by automatically detecting and fixing overlong code segments for refactoring opportunities in the software program.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Visual Basic.net, Ruby, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system described above is for purposes of example only, and may be implemented in any type of computer system or programming or processing environment, or in a computer program, alone or in conjunction with hardware. Various embodiments of the present may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. The system and method for finding and fixing overlong code segments may be implemented in any type of computer system or programming or processing environment. It is contemplated that the system and method for identifying and fixing overlong code segments might be run on a stand-alone computer system, such as the one described above. The system and method for identifying and fixing overlong code segments might also be run from a server computer systems system that can be accessed by a plurality of client computer systems interconnected over an intranet network. Finally, the system and method for identifying and fixing overlong code segments projects may be run from a server computer system that is accessible to clients over the Internet.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method performed by a device having a processor and memory for enhancing operable functionality of a software program by eliminating and automatically fixing long code segments in the software program, comprising:
   receiving, by the device, a graph database structure representation of the software program comprising a plurality of input source code segments;
   evaluating, by the device, the graph database structure representation of the software program to identify at least a first long code segment from the plurality of input source code segments based on a plurality of predetermined code metric values, wherein evaluating the graph database structure comprises:
      applying natural language processing (NLP) or machine learning techniques to assess each of the code segments for predetermined code metrics for use in determining whether the code segment is overlong;
      assessing the input source code segments to determine if the any of the code segments are autogenerated; and
      using an NLP or machine learning process to determine if any of the code segments are one of either (a) a test method or (b) normal method, wherein the test method includes at least one of (i) a segment name and (ii) annotations that indicate a method is the test method;
   outputting, by the device, the first long code segment for storage in a code fix issue queue;
   applying, by the device, a plurality of extraction algorithms to at least refactor the first long code segment to generate a second code segment that is semantically equivalent to and shorter than the first long code segment, wherein the extraction algorithms include a fixer service that includes a variable cohesion based extraction module, which is configured to construct extraction candidates as graphs of clustered method variables and statements that use variables, wherein the variables are clustered together if the variables depend on each other and the variable cohesion based extraction module splits extraction candidates around at least one of
      (i) biggest articulation points and (ii) around re-initializations of a same variable;
   outputting, by the device, the second code segment for storage in a fixed issue queue;
   generating, by the device, a fixed graph database structure representation of the software program using the second code segment to replace the first long code segment; and
   outputting, by the device, the fixed graph database structure representation for storage in memory.

2. The method of claim 1, where receiving the graph database structure representation of the software program comprises receiving the graph database structure representation from a graph database structure sandbox container running a graph engine mounting a copy of the graph database structure representation of the software program.

3. The method of claim 1, where evaluating the graph database structure representation of the software program to identify at least the first long code segment comprises identifying and grouping any of the plurality of input source code segments exceeding a maximum length threshold into a batch that is optimized for performance and correctness before storing the batch into the code fix issue queue.

4. The method of claim 1, where evaluating the graph database structure representation of the software program to identify at least the first long code segment comprises:
   removing any of the plurality of input source code segments that meet a first code metric value to identify one or more candidate source code segments;
   assessing each of the one or more candidate source code segments against a second code metric value to identify a set of candidate source code segments that contain the second code metric value; and
   assessing the set of candidate source code segments against a first tailored set of code length thresholds to identify any overlong source code segment in the first set of candidate source code segments having a code length which meets or exceeds at least two of the first tailored set of code length thresholds.

5. The method of claim 1, where outputting the first long code segment comprises storing the first long code segment as a work-to-do entity in a relational storage.

6. The method of claim 1, where applying the plurality of extraction algorithms comprises applying a block and variable based extraction algorithm to at least the first long code segment to generate a second code segment that is semantically equivalent to and shorter than the first long code segment.

7. The method of claim 6, where applying the block and variable based extraction algorithm comprises:
   identifying and validating a block-based candidate from the first long code segment;
   identifying and validating variable-based candidates from the first long code segment; and
   selecting an extraction candidate from the block-based candidate and the variable-based candidate.

8. The method of claim 1, where applying the plurality of extraction algorithms comprises applying a variable-cohesion based extraction algorithm to at least the first long code segment to generate a second code segment that is semantically equivalent to and shorter than the first long code segment.

9. The method of claim 8, where applying the variable-cohesion based extraction algorithm comprises:
   identifying an extraction candidate as a graph of clustered method variables from the first long code segment;
   normalizing the extraction candidate to eliminate graph holes, complete scopes and eliminate graph overlap; and
   identifying and validating each extraction candidate.

10. A computer program product comprising at least one recordable medium having stored thereon executable instructions and data which, when executed by at least one processing device, cause the at least one processing device to perform operations comprising:
   receive a graph database structure representation of the software program comprising a plurality of input source code segments;
   evaluate the graph database structure representation of the software program to identify at least a first long code segment from the plurality of input source code segments based on a plurality of predetermined code metric values,
   wherein evaluating the graph database structure comprises:
      applying natural language processing (NLP) or machine learning techniques to assess each of the code segments for predetermined code metrics for use in determining whether the code segment is overlong;

assessing the input source code segments to determine if the any of the code segments are autogenerated; and using an NLP or machine learning process to determine if any of the code segments are one of either (a) a test method or (b) normal method, wherein the test method includes at least one of (i) a segment name and (ii) annotations that indicate a method is the test method;

output the first long code segment for storage in a code fix issue queue;

apply a plurality of extraction algorithms to at least refactor the first long code segment to generate a second code segment that is semantically equivalent to and shorter than the first long code segment, wherein the extraction algorithms include a fixer service that includes a variable cohesion based extraction module, which is configured to construct extraction candidates as graphs of clustered method variables and statements that use variables, wherein the variables are clustered together if the variables depend on each other and the variable cohesion based extraction module splits extraction candidates around at least one of (i) biggest articulation points and (ii) around re-initializations of a same variable;;

output the second code segment for storage in a fixed issue queue;

generate a fixed graph database structure representation of the software program using the second code segment to replace the first long code segment; and output the fixed graph database structure representation for storage in memory.

11. The computer program product of claim 10, where receiving the graph database structure representation of the software program comprises receiving the graph database structure representation from a graph database structure sandbox container running a graph engine mounting a copy of the graph database structure representation of the software program.

12. The computer program product of claim 10, where evaluating the graph database structure representation of the software program to identify at least the first long code segment comprises identifying and grouping any of the plurality of input source code segments exceeding a maximum length threshold into a batch that is optimized for performance and correctness before storing the batch into the code fix issue queue.

13. The computer program product of claim 10, where evaluating the graph database structure representation of the software program to identify at least the first long code segment comprises:

removing any of the plurality of input source code segments that meet a first code metric value to identify one or more candidate source code segments;

assessing each of the one or more candidate source code segments against a second code metric value to identify a set of candidate source code segments that contain the second code metric value; and assessing the set of candidate source code segments against a first tailored set of code length thresholds to identify any overlong source code segment in the first set of candidate source code segments having a code length which meets or exceeds at least two of the first tailored set of code length thresholds.

14. The computer program product of claim 10, where outputting the first long code segment comprises storing the first long code segment as a work-to-do entity in a relational storage.

15. The computer program product of claim 10, where applying the plurality of extraction algorithms comprises applying a block and variable based extraction algorithm to at least the first long code segment to generate a second code segment that is semantically equivalent to and shorter than the first long code segment.

16. The computer program product of claim 15, where applying the block and variable based extraction algorithm comprises:

identifying and validating a block-based candidate from the first long code segment;

identifying and validating variable-based candidates from the first long code segment; and selecting an extraction candidate from the block-based candidate and the variable-based candidate.

17. The computer program product of claim 10, where applying the plurality of extraction algorithms comprises applying a variable-cohesion based extraction algorithm to at least the first long code segment to generate a second code segment that is semantically equivalent to and shorter than the first long code segment.

18. The computer program product of claim 17, where applying the variable-cohesion based extraction algorithm comprises:

identifying an extraction candidate as a graph of clustered method variables from the first long code segment;

normalizing the extraction candidate to eliminate graph holes, complete scopes and eliminate graph overlap; and identifying and validating each extraction candidate.

19. A system comprising:

one or more processors;

a memory coupled to at least one of the processors; and a set of instructions stored in the memory and executed by at least one of the processors to enhance operable functionality of a software program by eliminating long code segments in the software program, wherein the set of instructions are executable to perform operations comprising:

receiving a graph database structure representation of the software program from a graph database structure sandbox container running a graph engine mounting a copy of the graph database structure representation of the software program comprising a plurality of input source code segments;

evaluating the graph database structure representation of the software program to identify at least a first long code segment from the plurality of input source code segments based on a plurality of predetermined code metric values by identifying and grouping any of the plurality of input source code segments exceeding a maximum length threshold into a batch that is optimized for performance and correctness, wherein evaluating the graph database structure comprises:

applying natural language processing (NLP) or machine learning techniques to assess each of the code segments or predetermined code metrics for use in determining whether the code segment is overlong;

assessing the input source code segments to determine if the any of the code segments are autogenerated; and using an NLP or machine learning process to determine if any of the code segments are one of either (a) a test method or (b) normal method, wherein the test method includes at least one of (i) a segment name and (ii) annotations that indicate a method is the test method;

outputting the first long code segment for storage in a code fix issue queue;

applying a plurality of extraction algorithms to at least refactor the first long code segment to generate a second code segment that is semantically equivalent to and shorter than the first long code segment, wherein the extraction algorithms include a fixer service that includes a variable cohesion based extraction module, which is configured to construct extraction candidates as graphs of clustered method variables and statements that use variables, wherein the variables are clustered together if the variables depend on each other and the variable cohesion based extraction module splits extraction candidates around at least one of (i) biggest articulation points and (ii) around re-initializations of a same variable;;

outputting the second code segment for storage in a fixed issue queue;

generating a fixed graph database structure representation of the software program using the second code segment to replace the first long code segment; and outputting the fixed graph database structure representation for storage in memory.

20. The system of claim 19, where applying the plurality of extraction algorithms comprises applying a block and variable based extraction algorithm to at least the first long code segment to generate a second code segment that is semantically equivalent to and shorter than the first long code segment.

21. The system of claim 20, where applying the block and variable based extraction algorithm comprises:
identifying and validating a block-based candidate from the first long code segment;
identifying and validating variable-based candidates from the first long code segment; and
selecting an extraction candidate from the block-based candidate and the variable-based candidate.

22. The system of claim 19, where applying the plurality of extraction algorithms comprises applying a variable-cohesion based extraction algorithm to at least the first long code segment to generate a second code segment that is semantically equivalent to and shorter than the first long code segment.

23. The system of claim 22, where applying the variable-cohesion based extraction algorithm comprises:
identifying an extraction candidate as a graph of clustered method variables from the first long code segment;
normalizing the extraction candidate to eliminate graph holes, complete scopes and eliminate graph overlap; and
identifying and validating each extraction candidate.

* * * * *